United States Patent [19]

Fisher et al.

[11] Patent Number: 4,996,036

[45] Date of Patent: Feb. 26, 1991

[54] ABATEMENT OF $NO_x$ FROM HYDROXYLAMINE DISULFONATE PROCESS

[75] Inventors: William B. Fisher; Lamberto Crescentini; Laszlo J. Balint, all of Chester, Va.

[73] Assignee: Allied-Signal Inc., Morris Township, Morris County, N.J.

[21] Appl. No.: 291,089

[22] Filed: Dec. 28, 1988

[51] Int. Cl.$^5$ .................... C01B 21/093; C01B 21/20; C01B 21/00
[52] U.S. Cl. ...................................... 423/388; 423/235
[58] Field of Search .............. 423/235, 235 D, 239 A, 423/388

[56] References Cited

U.S. PATENT DOCUMENTS

| | | | |
|---|---|---|---|
| 4,045,540 | 8/1977 | Hertzog | 423/235 |
| 4,233,279 | 11/1980 | Balint et al. | 423/235 |
| 4,839,148 | 6/1989 | Ritter et al. | 423/239 |
| 4,847,054 | 7/1989 | Weisweiler | 423/239 |
| 4,851,201 | 7/1989 | Heap et al. | 423/235 |
| 4,853,193 | 8/1989 | Cahn et al. | 423/235 |

OTHER PUBLICATIONS

European Search Report EP 89 11 9 610, Apr. 9, 1990 for corresponding international PCT application.

Primary Examiner—Gregory A. Heller

[57] ABSTRACT

In the production of hydroxylamine disulfonate diammonium salt (DS) comprising reacting ammonium nitrite with ammonium bisulfite and sulfur dioxide in an absorption reactor whereby emission gases comprising $NO_x$, particularly NO, are released as a result of side reactions, the method of treating said emission gases to reduce the concentration of NO comprises adding $NO_2$ to the emission gases and contacting the mixture of $NO_2$ and emission gases with an aqueous alkali solution sufficiently to form nitrite and nitrate ions in said alkali solution.

7 Claims, 2 Drawing Sheets

ABATEMENT OF NO$_x$ FROM HYDROXYLAMINE DISULFONATE PROCESS

BACKGROUND OF THE INVENTION

1. Field of the Invention

The subject matter of the invention is directed to a process for the production of hydroxylamine disulfonate diammonium salt (DS) and the effective reduction of NO$_x$ emissions from the process.

2. Description of Related Art

Hydroxylamine is widely useful in the transformation of organic compounds to derivatives, which in turn may be intermediates in pharmaceutical or other industrial synthesis of complex molecules. An important use of hydroxylamine is captively in the synthesis of caprolactam, the raw material for Nylon 6.

The classical method for the production of hydroxylamine is that ascribed to Raschig. An important commercial process consists of the reduction of ammonium nitrite with ammonium bisulfite and sulfur dioxide to give hydroxylamine disulfornate diammonium salt (DS). Upon hydrolysis, DS gives hydroxylamine sulfate, an intermediate in the production of caprolactam. The overall reaction for production of DS is:

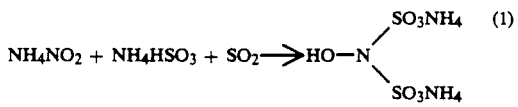

where NH$_4$HSO$_3$ is produced from SO$_2$ and a basic ammonium compound:

In commercial practice, the reaction is conducted in a packed tower or column where a solution of the products is recirculated, an aqueous nitrite solution is fed to the recirculating product stream, and supplemental trim ammonia, such as ammonium hydroxide or ammonium carbonate is added in an amount to satisfy the stoichiometric requirements NO$_2-$/NH$_4+$ = $\frac{1}{2}$, and SO$_2$ gas, obtained for example by combustion of sulfur with air, is fed at the bottom of the packed column and is vigorously contacted with the liquid in the packed section of the tower.

The amount of SO$_2$ fed to the tower should also satisfy the requirements of equation 1) above and the three reactants should therefore be fed in the molar proportions NO$_2-$/NH$_4+$/SO$_2$ = 1/2/2.

The reaction is complex, with the possibility of many side reactions which have been discussed authoritatively in a review by F. Seel, *Fortschr. Chem. Forsch.* 4, 301-332 (1963). Side reactions do occur and as a result NO$_x$ gases, predominantly NO, are released. Yields of DS are improved and the extent to which side reactions occur and NO$_x$ are formed is decreased when the reaction is carried out at lower temperatures, but even at 0° C., a temperature expensive to maintain, NO$_x$ emissions primarily NO, still constitute up to 1500 volume ppm in the vent gas.

Addition of NO$_2$ in a process for production of ammonium nitrite to improve yield and to reduce emission of nitrogen oxides is disclosed in Balint et al., U.S. Pat. No. 4,233,279, Nov. 11, 1980, also in Hertzog U.S. Pat. No. 4,045,540, Aug. 30, 1977, but there is no suggestion for addition of NO$_2$ in the manner of this invention.

Abating NO$_x$ from the vent gases in the system of this invention by absorbing the gases in an alkaline solution is not satisfactory since NO does not react with alkali.

Converting NO to NO$_2$ via the reaction 2NO+O$_2$→NO$_2$ with O$_2$ present in the mixture would require impractically long residence times, because of the low concentrations of NO present and the slow rate of the reaction.

It is desirable, therefore, to develop an effective method for abatement of NO$_x$ emissions from the process of production of DS.

SUMMARY OF THE INVENTION

This invention is directed to a process for the production of hydroxylamine disulfonate diammonium salt (DS) comprising reacting ammonium nitrite with ammonium bisulfite and sulfur dioxide in an absorption reactor whereby emission gases comprising NO$_x$, particularly NO, are released as a result of side reactions, wherein the method of treating said emission gases to reduce the concentration of NO comprises adding NO$_2$ to the emission gases and contacting the mixture of NO$_2$ and emission gases with an aqueous alkali solution sufficiently to form nitrite and nitrate ions in said alkali solution, thereby reducing the concentration of NO$_x$ in said emission gas.

DESCRIPTION OF THE PREFERRED EMBODIMENT

Figure 1:
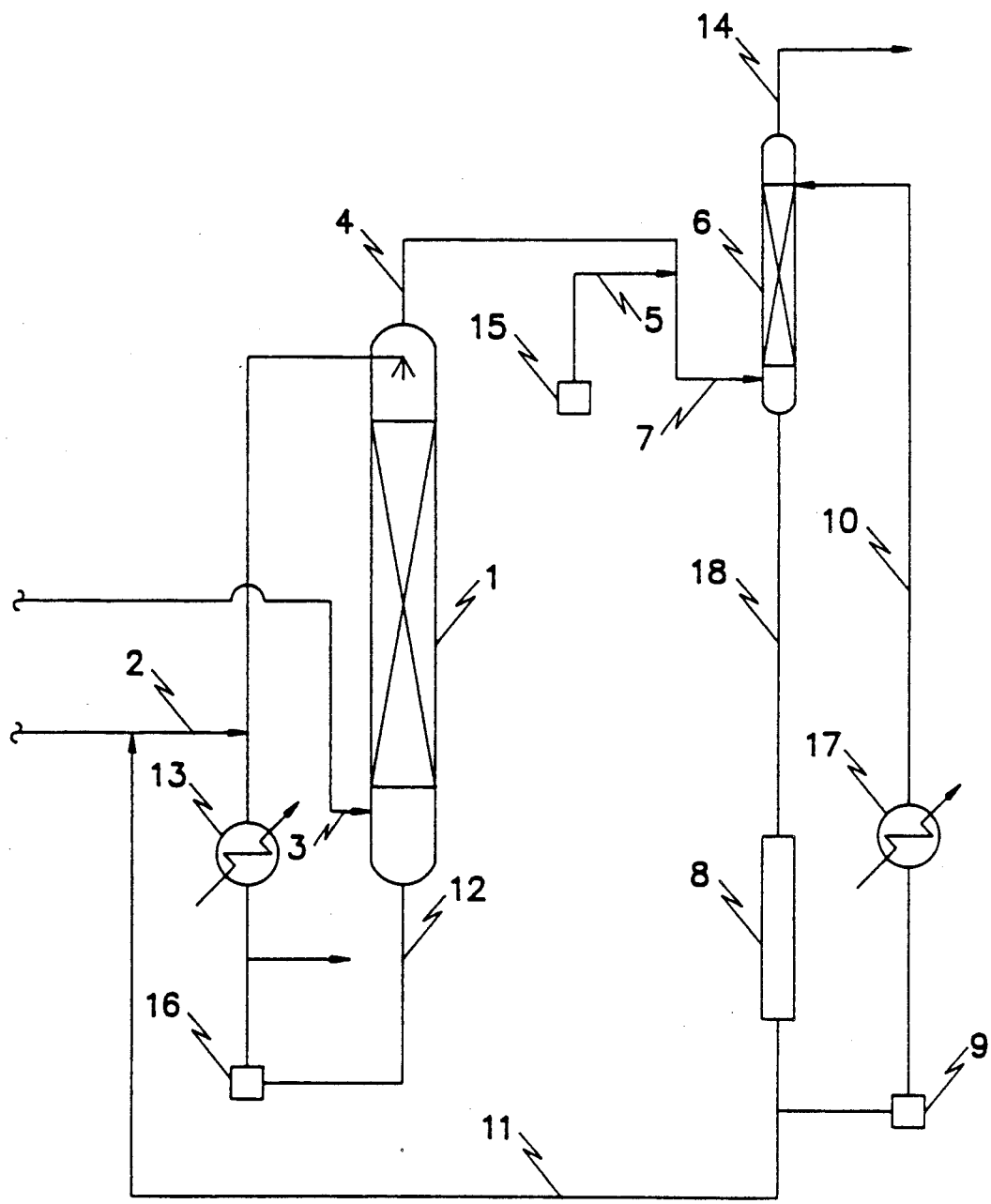
FIG. 1 shows a schematic arrangement of equipment useful in the DS production process including means of this invention for reducing NO$_x$ emissions.

A preferred embodiment incorporating the NO$_x$ emission reduction means of this invention is illustrated in FIG. 1. Packed column 1 provides appropriate packing to insure sufficient contact of the ammonium nitrite solution feed 2 and the SO$_2$ gas feed 3 to obtain the desired reaction to produce DS. The tower is operated at a temperature less than 20° C., preferably lower, to improve yields to DS and therefore reduce the extent to which side reactions occur and NO$_x$ are found. Nevertheless, emission gases exit through vent 4 containing up to about 3000 volume ppm NO$_x$, primarily NO, and small quantities of SO$_2$, for example up to 20 ppm.

Although adding a gas which is in itself an undesirable pollutant may seem paradoxical, we have found that the NO$_x$ concentration in the emission gases can be lowered substantially, down to at least 400 ppm, by adding NO$_2$ to the gases prior to attempting absorption in alkali.

In the figure, NO$_2$ gas from a source 15 is added to the emission gases at 5. As a source of NO$_2$, gases obtained by the combustion of ammonia with air over a catalyst and containing 10% NO may be used after allowing for NO oxidation to NO$_2$ by the O$_2$ present in the mixture in a reactor with sufficient residence time.

Efficiency of removal of NO from the DS reaction vent gases has been found to depend on the ratio of NO$_2$ added to NO present. Effective removal is obtained with a ratio of NO$_2$/NO of from 1/1 to 3/1. Removal of 1 part NO has been found to require about 2 to 2.5 parts NO$_2$. It is possible to reduce the concentration of NO$_x$ in the emission gas to less that 400 ppm.

Figure 2:
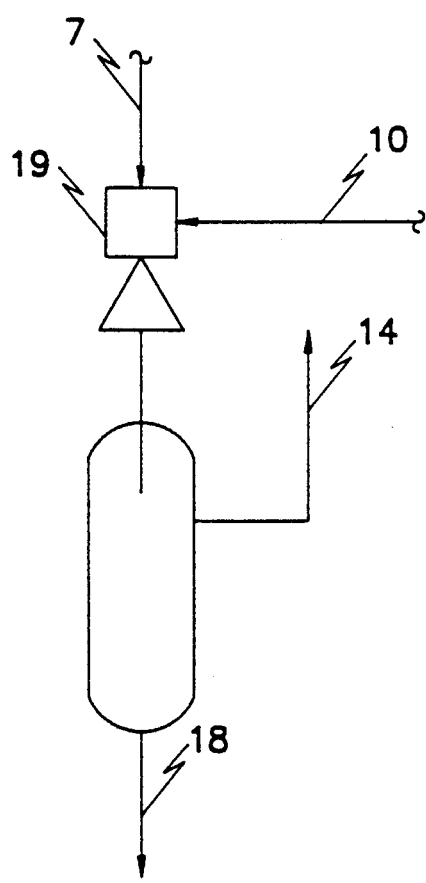
FIG. 2 shows a schematic arrangement of a venturi jet contacting device useful in the invention.

The mixture of emission gas containing NO and the NO$_2$ added is introduced to a packed tower 6 at entrance 7 for contact with alkali. Gas/liquid contacting devices that may be used include a tray tower and a venturi jet in addition to the packed tower illustrated. When a venturi jet is used a mist that is often found is eliminated. FIG. 2 illustrates a preferred means for contacting the emission gas mixture with alkali, which is in place of the packed tower 6 of FIG. 1. In FIG. 2, the emission gas mixture containing added NO$_2$ enters the venturi jet contacting device 19 through entrance 7. Alkali enters through line 10. After contact and expansion, vent gas is removed through vent 14 and the liquid alkali recirculated through line 18.

The alkali solution from source 8 can be pumped by pump 9 through line 10 to the top of tower 6 in FIG. 1 or the venturi jet contacting device 19 in FIG. 2. In this manner the alkali solution may be recirculated within the packed tower and returned through line 18.

Alkali that may be used include earth alkali metal hydroxides, oxides, carbonates and bicarbonates and alkali metal hydroxides, carbonates and bicarbonates. Examples include ammonium hydroxide, ammonium bicarbonate, ammonium carbonate, sodium hydroxide, sodium bicarbonate, sodium carbonate, and calcium hydroxide.

An analysis of the alkaline scrub liquor used for the absorption shows that nitrite and nitrate are formed. Since nitrite is one of the reactants used to produce DS, the scrub liquor can be added back to the column feed through line 11. Thus not only is the concentration of vented noxious gases decreased, but a material of value in the DS reaction is recovered.

EXAMPLE I

With reference to FIG. 1, approximately 70 liters/minute of a gas mixture containing 15% SO$_2$, 6% O$_2$ and 79% N$_2$ was fed continuously to packed column 1 at feed inlet 3. The column was a 4 inch diameter tower packed with 6 feet of ½ inch ceramic saddles. Approximately 7 liter/hour of alkaline solution containing 14% ammonium nitrite along with enough ammonium carbonate to give an overall ratio of ammonium ion to nitrite ion of about 2/1 was also fed at 2.

The operating temperature was maintained at 10° C. by recirculation of a portion of DS product solution by pump 16 from exit 12 through heat exchanger 13 to the top of the column.

Gases exiting the column at vent 4 had 1500 ppm NO$_x$, of which 1400 ppm was NO, corresponding to 0.255 moles NO$_x$/hour.

An NO$_2$-rich gas was added to the emission gases at 5 at 0.5 moles NO$_2$/hour. The combined gas streams were introduced to the bottom of a 3 inch diameter scrubber, column 6 packed with 2 feet of ¼" ceramic saddles.

In scrubber 6 the gases were contacted with 2.8 liters of a circulating solution of ammonium carbonate containing approximately 5 moles/liter ammonium ion. The solution was maintained at 12° C. by circulation through heat exchanger 17. Vent gases at 14 were analyzed for NO$_x$ every hour with the following results:

|  | Vol ppm NO$_x$ in Vent |
|---|---|
| Start | 1500 |
| 1st hour | 350 |
| 2nd hour | 370 |
| 3rd hour | 380 |
| 4th hour | 400 |

The ammonium carbonate solution was analyzed for nitrite and nitrate after the fourth hour and found to contain 2.21 moles of nitrite and 0.36 moles nitrate.

Thus, an overall balance shows 2.96 moles NO$_x$ introduced to the scrubber, 2.57 moles NO$_x$ absorbed and 0.27 moles NO$_x$ vented. Unaccounted NO$_x$ of the 0.12 moles is presumed vented as N$_2$.

EXAMPLE 2

The experiment of example 1 was repeated, with the ratio of NO$_2$/NO varied. The results:

|  | NO$_2$ ADDITION (MOLES/HR) | NO$_2$/NO | AVG. NO$_x$ IN VENT AT 14 (VOL PPM) |
|---|---|---|---|
| Control | 0 | ~0 | 1500 |
| #2 | 0.2 | 0.78 | 900 |
| #3 | 0.4 | 1.57 | 500 |
| #4 | 0.5 | 1.96 | 400 |
| #1 (from Example 1) | 0.5 | 2.08 | 375 |

What is claimed:

1. A process for the production of hydroxylamine disulfonate diammonium salt (DS) comprising reacting ammonium nitrite with ammonium bisulfite and sulfur dioxide in an absorption reactor whereby emission gases comprising NO$_x$, particularly NO, are released as a result of side reactions, the process comprising treating said emission gases to reduce the concentration of NO$_x$ comprising adding NO$_2$ to the emission gases and contacting the mixture of NO$_2$ and emission gases with an aqueous alkali solution sufficiently to form nitrite and nitrate ions in said alkali solution, thereby reducing the concentration of NO$_x$ in said emission gas.

2. The process of claim 1 wherein said NO$_2$ is added to the emission gases in an amount so that the ratio of NO$_2$/NO is from 1/1 to 3/1.

3. The process of claim 2 wherein the ratio of NO$_2$/NO is from 2/1 to 2.5/1.

4. The process of claim 2 wherein the aqueous alkali solution is selected from the group consisting of ammonium hydroxide, ammonium bicarbonate, and ammonium carbonate.

5. The process of claim 4 wherein at least a portion of the aqueous alkali solution, after said contact with the mixture of NO$_2$ and emission gases, is added to the ammonium nitrite feed for the reaction to produce DS.

6. The process of claim 4 wherein the concentration of NO$_x$ in said emission gas is reduced to less than 400 ppm.

7. The process of claim 4 wherein said contacting the mixture of NO$_2$ and emission gases with an aqueous alkali solution is accomplished by means of a venturi jet contacting device.

* * * * *